(12) United States Patent
Ieperen

(10) Patent No.: US 6,320,597 B1
(45) Date of Patent: Nov. 20, 2001

(54) METHOD FOR EDITING OBJECTS REPRESENTING WRITING ON AN ELECTRONIC WRITEBOARD

(75) Inventor: Taco Van Ieperen, Calgary (CA)

(73) Assignee: Smart Technologies, Inc., Calgary (CA)

( * ) Notice: Subject to any disclaimer, the term of this patent is extended or adjusted under 35 U.S.C. 154(b) by 0 days.

(21) Appl. No.: 09/285,674

(22) Filed: Apr. 5, 1999

Related U.S. Application Data

(60) Provisional application No. 60/080,820, filed on Apr. 6, 1998.

(51) Int. Cl.[7] .................................................. G06T 11/80
(52) U.S. Cl. ............................................................ 345/629
(58) Field of Search .................................. 345/118, 173, 345/179, 358, 435, 629

(56) References Cited

U.S. PATENT DOCUMENTS

| | | | | |
|---|---|---|---|---|
| 5,471,578 | * | 11/1995 | Moran et al. | 395/161 |
| 5,784,061 | * | 7/1998 | Moran et al. | 345/358 |
| 5,889,523 | * | 3/1999 | Wilcox et al. | 345/357 |

* cited by examiner

Primary Examiner—Almis R. Jankus
Assistant Examiner—G. F. Cunningham
(74) Attorney, Agent, or Firm—Katten Muchin Zavis

(57) ABSTRACT

A method for editing objects representing writing on an electronic writeboard comprises the steps of: creating an object representing writing on the electronic writeboard; determining if the created object overlies an existing object by at least a threshold amount; and merging the created and existing objects to create a new object if the created object overlies the existing object by at least the threshold amount. An editor for editing objects and an interactive display system are also provided.

19 Claims, 3 Drawing Sheets

METHOD FOR EDITING OBJECTS REPRESENTING WRITING ON AN ELECTRONIC WRITEBOARD

This application claims benefit Provisional No. 60/080,820 filed Apr. 6, 1998.

FIELD OF THE INVENTION

The present invention relates to electronic writeboards and in particular to a method and editor for editing objects representing writing on an electronic writeboard.

BACKGROUND OF THE INVENTION

Electronic writeboards or whiteboards (EWBs) are known in the art and have been used in conjunction with host computers executing applications software to provide enhanced multimedia and teleconferencing capabilities. An example of an electronic writeboard of this nature is sold by SMART Technologies Inc. of Calgary, Alberta, Canada under the name SMART Board. The SMART Board electronic writeboard includes a touch sensitive panel, a tool tray accommodating a plurality of tools such as coloured pens and an eraser as well as a driver and an associated controller.

In use, the electronic writeboard is connected to a host processor such as a personal computer operating in a Windows® environment and executing applications software, via a serial data connection. The electronic writeboard can be operated in one of three modes, namely a projected mouse mode, a projected mark-up mode and a non-projected mode.

In the projected mouse mode, the image displayed on the monitor of the personal computer is projected onto the touch sensitive panel. In this case, the electronic writeboard functions as a giant mouse providing input to the personal computer in response to user contact with the touch sensitive panel. Specifically, the electronic writeboard generates mouse events in response to user contact with the touch sensitive panel, which are conveyed to the personal computer for processing. Thus, by contacting the touch sensitive panel, the personal computer can be conditioned to open and display menus, to activate displayed menus, to drag icons, to execute software and to switch applications by changing input focus. The latter event of course is achieved by contacting the touch sensitive panel outside of the window of the active application running on the personal computer.

In the projected mark-up mode the coloured pens and eraser are used to contact the touch sensitive panel. The active application running on the personal computer tracks where writing and erasing has occurred and maintains a computerized image of what is drawn on and erased from the touch sensitive panel. The computerized image is projected onto the touch sensitive panel so that the user can see the computerized image.

In the non-projected mode, no images are displayed on the touch sensitive panel. Dry-erase markers are used to contact the touch sensitive panel. The application running on the personal computer tracks where writing and erasing has occurred and maintains a computerized image of what is drawn on the touch sensitive panel. However, since no image is displayed on the touch sensitive panel, the electronic writeboard is not interactive when operated in this mode.

During operation in the projected mark-up mode, as writing on the touch sensitive panel occurs, the applications software executed by the host computer creates one or more objects representing the writing. Each object is bounded by a rectangular area encompassing the writing. When an existing object displayed on the touch sensitive panel is modified, the applications software creates a separate object for the annotations made to the existing object and layers the newly created object over the original object so that the image projected onto the touch sensitive panel reflects the modifications made to the object. This however, creates problems when it is desired to manipulate the modified object due to the fact that the original object and the annotations are separate, layered objects. For example, highlighting an object and then trying to move the highlighted object either results in the original object being moved without the annotations or results in only the annotations being moved without the original object. Accordingly improved methods to deal with objects representing writing on an electronic writeboard are desired.

It is therefore an object of the present invention to provide a novel method and editor for editing objects representing writing on an electronic writeboard.

SUMMARY OF THE INVENTION

According to one aspect of the present invention there is provided a method for editing objects representing writing on an electronic writeboard comprising the steps of:

creating an object representing writing on said electronic writeboard;

determining if said created object overlies an existing object by at least a threshold amount; and merging said created and existing objects to create a new object if said created object overlies said existing object by at least said threshold amount.

Preferably, the created and existing objects are merged if at least 75% of the created object is contained within the existing object. It is also preferred that objects are bounded by geometric shapes in the form of rectangles and that at the determining step, the areas of the rectangles are compared to determine overlap therebetween.

According to another aspect of the present invention there is provided a method for editing writing on an electronic writeboard comprising the steps of:

creating an object representing writing on said electronic writeboard;

determining if said created object overlies an existing object; and creating a new object incorporating writing represented by said created and existing objects if said created object overlies said existing object by at least a threshold amount.

According to yet another aspect of the present invention there is provided an editor for an electronic writeboard for editing objects representing writing on said electronic writeboard comprising:

means for creating an object representing writing on said electronic writeboard;

means for determining if said created object overlies an existing object by at least a threshold amount; and means for merging said created and existing objects if said created object overlies said existing object by at least said threshold amount.

According to still yet another aspect of the present invention there is provided an interactive display system comprising:

a touch sensitive panel responsive to user contact in the form of writing on said touch sensitive panel and generating signals representing the location of writing thereon;

a projector to project images on said touch sensitive panel reflecting writing on said touch sensitive panel; and a computer executing an applications program, said applications program being responsive to said signals and including means to create objects representing writing on said touch sensitive panel, means to determine if created objects overlie existing objects and means to create new objects if created objects overlie existing objects by at least a threshold amount, said applications program providing updated image output to said projector to reflect writing on said touch sensitive panel and being responsive to user contact to allow objects representing writing to be manipulated.

According to still yet another aspect of the present invention there is provided a computer readable medium including computer program code for editing writing on an electronic writeboard, said computer readable medium comprising:

computer program code for creating an object representing writing on said electronic writeboard;

computer program code for determining if the created object overlies an existing object by at least a threshold amount; and computer program code for merging said created and existing objects to create a new object if said created object overlies said existing object by at least said threshold amount.

The present invention provides advantages in that if an existing object representing writing is modified and the object representing the annotations to the existing object overlies the existing object by a threshold amount, the existing object and the object representing the annotations are merged to create a new single object. Thus, manipulations to the newly created object effect both the original writing and the annotations.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
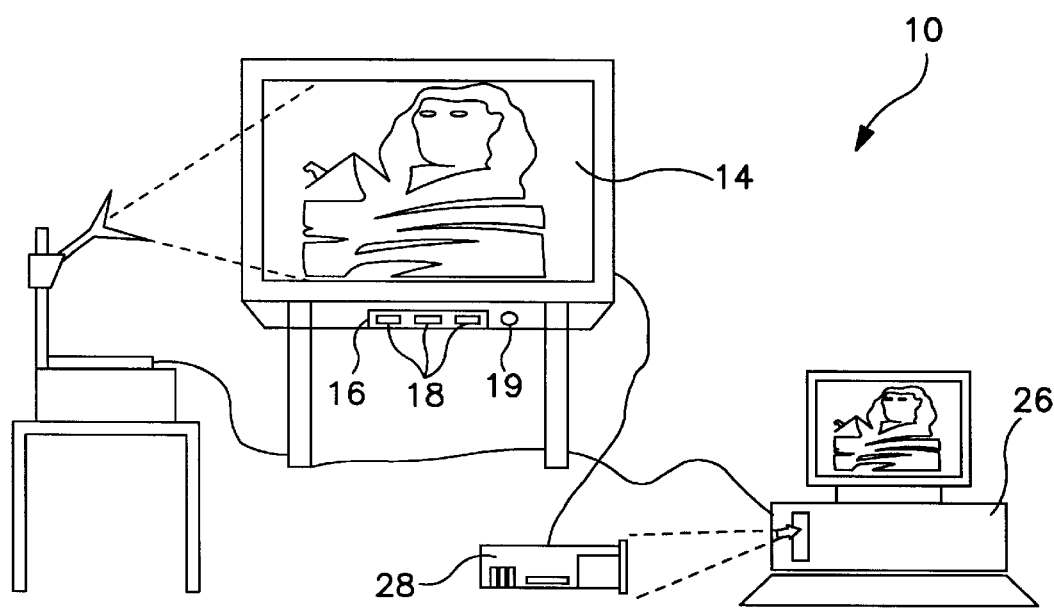
FIG. 1 is schematic diagram of an interactive display system including a touch sensitive panel.
Figure 2:
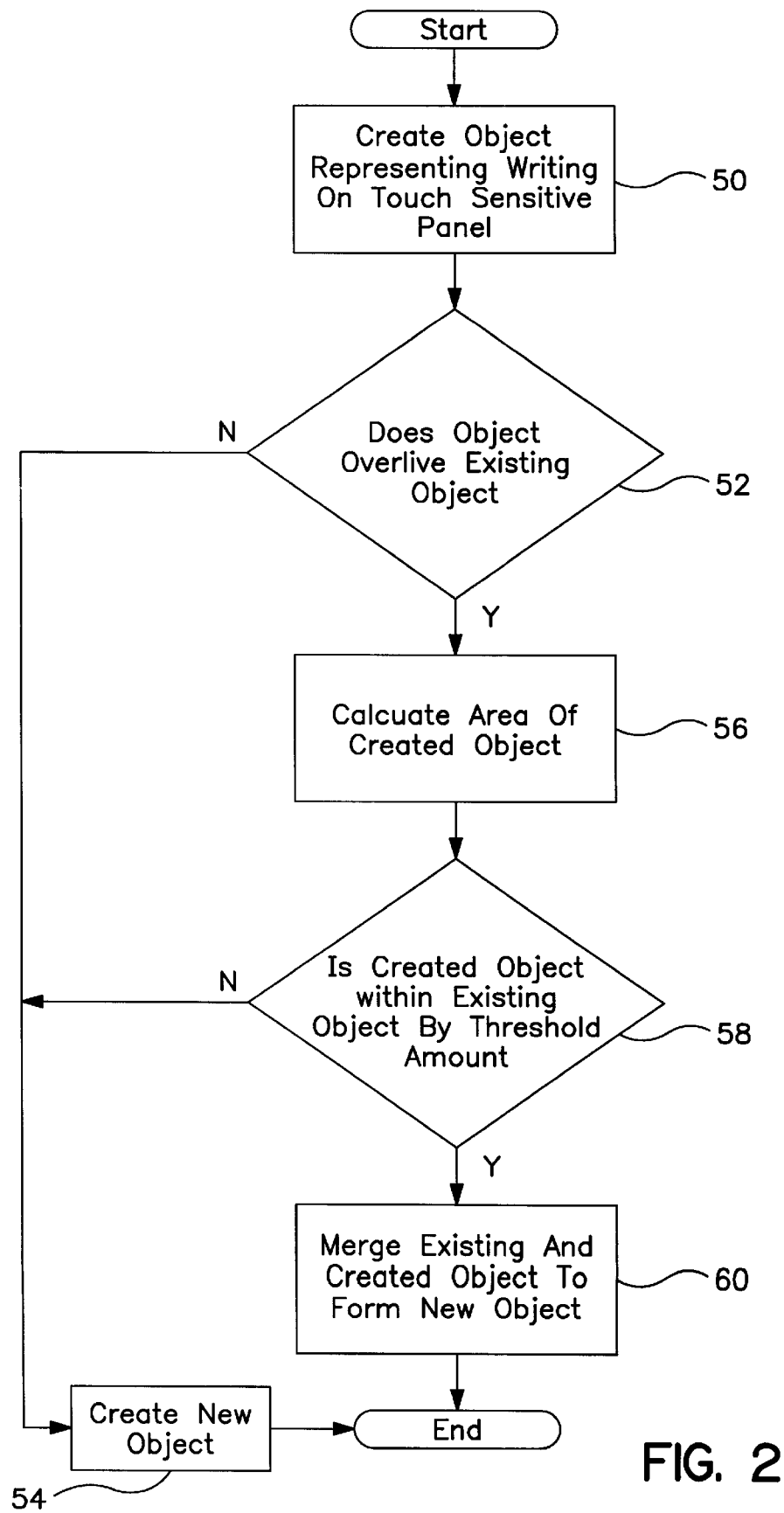
FIG. 2 is a flow chart illustrating the steps performed by applications software executed by a host computer forming part of the interactive display system of FIG. 1 when editing objects representing writing on the touch sensitive panel.

Referring now to FIG. 1, an interactive display system similar to that disclosed in U.S. Pat. No. 5,448,263 to Martin is shown and is generally indicated to by reference numeral 10. As can be seen, interactive display system 10 includes an electronic writeboard 12 (EWB) of the type manufactured by SMART Technologies Inc. under model No. SB360 and sold under the name SMART Board. The SMART Board 12 includes a touch sensitive panel 14 and a tool tray 16 accommodating a plurality of tools 18 and having at least one user selectable button 19. The tools 18 include a number of colored pens and an eraser. A controller 28 having memory is installed in a slot of a personal computer 26 and executes a controller application to control the overall operation of the SMART Board 12. A driver in the form of an application is executed by the personal computer 26 and translates serial data from the controller 28 into events such as mouse events, tool change events and button press events.

The personal computer 26 is connected to a liquid crystal display panel 30 positioned on an overhead projector 32 so that the screen image presented on the monitor of the personal computer is projected onto the touch sensitive panel 14. As will be appreciated, the touch sensitive panel can be placed in front of a rear projection system or alternatively, the projector 32 and touch sensitive panel can be integrated into a single unit.

When the electronic writeboard 12 and the personal computer 26 are connected and initialized, the electronic writeboard driver registers with the writeboard applications software executed by the personal computer. During this registration process, the driver determines the messages to which the applications software responds. Once the registration process has been completed, events generated by the SMART Board as a result of user contact with the touch sensitive panel, selection of a tool, pressing of a button etc. are sent to the applications software.

If the applications software is not "aware" of the SMART Board 12 such as Microsoft NetMeeting® software (i.e. the applications software does not use the SMART Board as the SDK source code), the personal computer 26 executes Aware interface software to interface the SMART Board 12 and the applications software. Specifics of the Aware interface software are described in pending U.S. Application Ser. No. 08/962,039 filed on Oct. 31, 1997 and assigned to the assignee of the present invention, the contents of which are incorporated herein by reference.

Turning now to FIGS. 2 to 4c, in the projected mark-up mode, when a tool 18 is used to write on the touch sensitive panel 14, the applications software tracks where writing and erasing on the touch sensitive panel has occurred and provides image output to the projector 30 so that the images projected onto the touch sensitive panel 14 are updated to reflect the writing and erasing. The applications software generates objects representing the writing (block 50) and stores the objects on "pages" allowing the objects to be moved, sized and otherwise manipulated in a conventional manner. Each object is bounded by a geometric area, in this particular example a rectangle, encompassing the writing and is created in response to an event such as a tool up or button press event. Writing within the objects can also be erased by moving the eraser over the touch sensitive panel 14. The manner in which writing is erased is described in Applicant's co-pending application filed on even date entitled "Method For Erasing On An Electronic Writeboard", the contents of which are incorporated herein by reference.

Once an object representing writing on the touch sensitive panel 14 is created, the applications software checks the current page to determine whether the created object overlies an existing object (block 52). If not, the new object is saved as a separate object and is associated with the current page (block 54). If the created object overlies an existing object, the area of the created object is calculated (block 56). The applications software then checks to determine if at least a threshold amount, in this case 75%, of the area of the created object is contained within the existing object (block 58). If not, the new object is saved as a separate, layered object and is associated with the current page (block 52). If 75% or more of the area of the created object is contained within the existing object, the applications software merges the created and existing objects to form a new separate object (block 60). The new object is saved and is associated with the current page. Appendix A is pseudo-code representing the above described steps.

As will be appreciated, annotations made to writing represented by an object will result in the creation of a single object if the annotations made to the writing are in close proximity to the existing object. Thus, the annotated writing can be manipulated in its entirety by selecting the newly created object and invoking the desired actions using a tool 18 or other input device. This of course overcomes the disadvantages associated with the prior art.

Figure 3A:
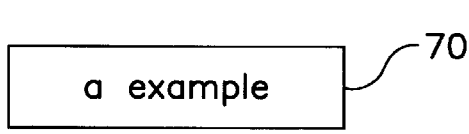
FIGS. 3a to 3c are illustrations of objects representing writing displayed on the touch sensitive panel shown in FIG. 1.
Figure 3B:
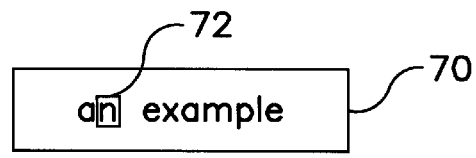
Figure 3C:
Figure 4A:
FIGS. 4a to 4c are illustrations of additional objects representing writing displayed on the touch sensitive panel shown in FIG. 1.
Figure 4B:
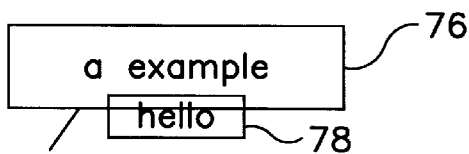
Figure 4C:
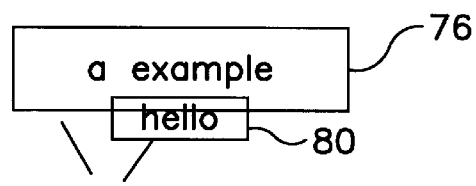

FIGS. 3a to 3c show an example of annotations 70 made to writing represented by an existing object 72 which results in the creation of a new separate object 74 while FIGS. 4a to 4c show an example of annotations 78 made to writing representing an existing object 76 which results in the creation of separate layered objects 76 and 80. In the case of FIGS. 3a to 3c, more than 75% of the area of object 72 is contained within the object 70 while in the case of FIGS. 4a to 4c, less than 75% of the area of object 78 is contained within the object 76.

Although the objects have been described as being bounded by rectangles, those of skill in the art will appreciate that other geometric shapes can be selected. Also, although the threshold amount has been described as being equal to 75%, the threshold amount can be set to basically any desired percentage to suit the particular environment.

Also, although the editing method has been described for use in an interactive display system, the editing method can be used in virtually any writeboard or whiteboard environment where writing on the whiteboard is recorded by a processor as objects.

The present invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network computer system.

Although a preferred embodiment of the present invention has been described, those of skill in the art will appreciate that variations and modifications may be made without departing from the spirit and scope thereof as defined by the appended claims.

APPENDIX A

```
FUNCTION AddItemToPage(ITEM newItem)
{
    //Only combine items if both are written. Check if the new item
    is written if (newItem.IsAWrittenItem())
    {
        //Find the rectangle of the new item
        RECTANGLE newItemRect=newItem.GetRectangle()
        INTEGER
SizeNewItemRect=newItemRect.Width()*newItemRect.Height();
        //Test all other items on the page
        INTEGER count=GetNumberOfItemsOnPage();
        for (INTEGER index=1 to count)
        {
```

APPENDIX A -continued

```
            //Get an item from the page
            ITEM testItem=GetItemOnPage(index)
            //Only bother testing if it is a written item
            if (testitem.IsAWrittenItem= =TRUE)
            {
                //Calculate the intersection of the two
                rectangles
                RECTANGLE testRect=
                testItem.GetRectangle()
                RECTANGLE
intersection=IntersectRectangle(testRect,newItem)
                INTEGER
sizeIntersection=intersection.Width()*intersection.Height();
                INTEGER
percentageOverlap=(sizeIntersection*100/sizeNewItemRect);
                //Do they overlap by more than 75%?
                If (percentageOverlap > 70)
                {
                    //Make a new item which is a com-
bination of the two items
                    ITEM combinedItem=
                    Combine(testItem.newItem)
                    //Remove the old item since it is
now part of the new item
                    DeleteItemFromPage(testItem)
                    //Add the new item to the page
                    AddItemToPage(combinedItem)
                    return;
                }
            }
        }
        //We didn't find any matches, so add the new item without
combining it with anything
        AddItemToPage(newItem);
        return;
}
```

I claim:

1. A method for editing objects representing writing on an electronic writeboard comprising the steps of:

creating an object representing writing on said electronic writeboard;

determining if said created object overlies an existing object by at least a threshold amount; and merging said created and existing objects to create a new object if at least 75% of said created object is contained within said existing object.

2. A method of editing writing on an electronic writeboard comprising the steps of:

creating an object representing writing on said electronic writeboard;

determining if said created object overlies an existing object;

creating a new object incorporating writing represented by said created and existing objects if said created object overlies said existing object by at least a threshold amount; and storing said created and existing objects as layered objects if said created object overlies said existing object by less than said threshold amount.

3. An interactive display system comprising:

a touch sensitive panel responsive to user contact in the form of writing on said touch sensitive panel and generating signals representing the location of writing thereon;

a projector to project images on said touch sensitive panel reflecting writing on said touch sensitive panel; and a computer executing an applications program, said applications program being responsive to said signals and including means to create objects representing writing on said touch sensitive panel, means to determine if created objects overlie existing objects, means to create new objects if created objects overlie existing objects by at least a threshold amount and means for storing said created and existing objects as layered objects if said created object overlies said existing object by less than said threshold amount, said applications program providing updated image output to said projector to reflect writing on said touch sensitive panel and being responsive to user input to allow objects representing writing to be manipulated.

4. The method of claim 1 wherein said objects are bounded by rectangles and wherein at said determining step, the areas of said rectangles are compared to determine overlap therebetween.

5. The method of claim 2 wherein said new object is created if at least 75% of said created object is contained within said existing object.

6. The method of claim 5 wherein said created, existing and new objects are bounded by geometric shapes encompassing the writing.

7. The method of claim 6 wherein said geometric shapes are rectangles.

8. An editor for an electronic writeboard system for editing objects representing writing on said electronic writeboard comprising:

means for creating an object representing writing on said electronic writeboard;

means for determining if said created object overlies an existing object by at least a threshold amount; and means for merging said created and existing objects to create a new object if at least 75% of said created object is contained within said existing object.

9. An interactive display system as defined in claim 3 herein said applications program bounds said created, existing and new objects by geometric shapes encompassing said writing.

10. An interactive display system as defined in claim 9 wherein said geometric shapes are rectangles.

11. An interactive display system as defined in claim 10 wherein said new objects are created if at least 75% of said created objects are contained within said existing objects.

12. A computer readable medium including computer program code for editing writing on an electronic writeboard, said computer readable medium comprising:

computer program code for creating an object representing writing on said electronic writeboard;

computer program code for determining if the created object overlies an existing object by at least a threshold amount;

computer program code for merging said created and existing objects to create a new object if said created object overlies said existing object by at least said threshold amount; and computer program code for storing the created and existing objects as layered objects if said created object overlies said existing objects by less than said threshold amount.

13. A computer readable medium as defined in claim 12 further comprising computer program code for bounding created, existing and new objects by geometric shapes encompassing the writing.

14. The method of claim 1 wherein an object representing writing is created in response to an electronic writeboard event.

15. The method of claim 14 wherein said electronic writeboard event is a tool up or button press event.

16. The method of claim 2 wherein an object representing writing is created in response to an electronic writeboard event.

17. The method of claim 16 wherein said electronic writeboard event is a tool up or button press event.

18. An interactive display system as defined in claim 3 wherein said applications program creates an object in response to an electronic writeboard event.

19. An interactive display system as defined in claim 18 wherein said electronic writeboard event is a tool up or button press event.

* * * * *